No. 754,645. PATENTED MAR. 15, 1904.
J. DUPONT.
PNEUMATIC TIRE.
APPLICATION FILED SEPT. 4, 1903.
NO MODEL.

Witnesses:

Joseph Dupont, Inventor

By Marion & Marion
Attorneys

No. 754,645.   Patented March 15, 1904.

UNITED STATES PATENT OFFICE.

JOSEPH DUPONT, OF WEST DERRY, NEW HAMPSHIRE.

PNEUMATIC TIRE.

SPECIFICATION forming part of Letters Patent No. 754,645, dated March 15, 1904.

Application filed September 4, 1903. Serial No. 171,922. (No model.)

*To all whom it may concern:*

Be it known that I, JOSEPH DUPONT, a citizen of the United States, residing at West Derry, county of Rockingham, State of New Hampshire, have invented certain new and useful Improvements in Pneumatic Tires; and I do hereby declare that the following is a full, clear, and exact description of the invention, such as will enable others skilled in the art to which it appertains to make and use the same.

My invention relates to pneumatic tires, such as used on automobiles, bicycles, and light road-wagons; and my object is to provide a tire of the class described which is so constructed as to prevent the possibility of serious inconvenience due to the puncturing of the tire.

In its general construction the tire consists of a tube adapted to be inflated by means of a hand-pump or similar device, and this tube is of sectional construction, comprising a plurality of compartments separated by air-tight walls. Arrangement is made for admitting air to these compartments or sections when the tire is inflated, and by reason of the sectional construction little difficulty results from the accidental puncturing of the tire, such an accident affecting only that section which may have been punctured.

More specifically the invention contemplates the use of an outer tube within which there is centrally disposed an inner tube of much reduced diameter, which inner tube connects with the outer tube by means of substantially radially-disposed diaphragms and longitudinally-disposed dividing-walls.

The invention consists in the construction and combination of parts to be more fully described hereinafter and definitely set forth in the claim.

Figure 1:
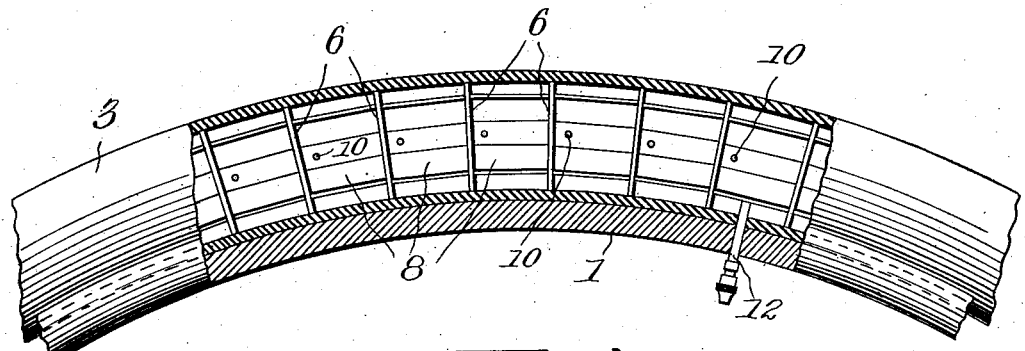
Figures 2, 3:
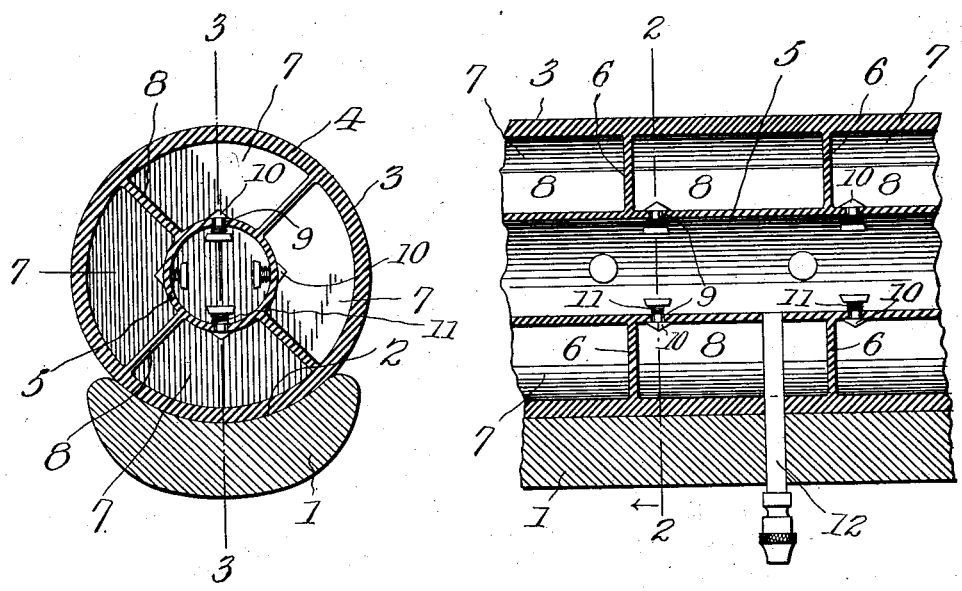

In the drawings, which fully illustrate my invention, Figure 1 represents a portion of the tire, the outer tube being shown as in section, together with a portion of the felly of the wheel, which is represented in connection with the tire. As will appear, a portion of this view represents the parts in elevation. Fig. 2 is a transverse section through the felly and tire, the same being shown upon an enlarged scale. This section is supposedly taken on the line 2 2 of Fig. 3. Fig. 3 is a longitudinal section of a portion of the tire supposedly taken on the line 3 3 of Fig. 2.

Throughout the drawings and specification the same numerals of reference denote like parts.

Referring more particularly to the parts, 1 represents the felly of the wheel upon which the tire is set, the same having the usual concave outer face 2, adapted to receive the tire 3. This tire 3 is preferably formed of rubber and consists of a continuous outer tube 4, within which there is formed, preferably centrally, as shown, an inner tube 5. As indicated, this inner tube is preferably of lighter construction than the outer tube. At a suitable distance apart there are provided transverse diaphragms or annular collars 6, which connect the outer side of the inner tube 5 with the outer tube 4, from which arrangement the space between the tubes is divided into a plurality of annular compartments. These compartments are themselves divided into smaller compartments 7 by means of longitudinally-disposed walls or webs 8, which walls are preferably four in number, as shown, and disposed at an equal distance apart, as indicated. It should be understood that the diaphragms 6, as well as the dividing-walls 8, are formed of rubber and are vulcanized or connected in a similar manner with the adjacent parts.

From the arrangement described it should be understood that the entire space between the inner and outer tubes of the tire is divided into a plurality of air-tight compartments. In order to enable these compartments to be inflated, the said inner tube 5 is provided with a plurality of openings 9, in which small valves 10 are seated of any common form, the same projecting into the inner tube and being provided with coil-springs 11, as indicated, adapted to constrain the valves toward a closed position. An inflating-nipple 12 is provided, the same passing to the interior of the inner tube, as indicated, and affording means for inflating the tire. It should be understood that by forcing air into the inner tube through the inflating-nipple the valves 10 would rise from their seats, so as to admit inflating-air into the compartments or sections 7 of the tire, it being understood that there is provided a valve in connection with each compartment. Now if from any accident it should happen that the outer tube 4 of the tire should become punctured this mishap would only affect the compartment at the point where the puncturing occurred. The tire remains substantially intact except at that section. Evidently no serious difficulty would be encountered, and the puncture could be repaired at the end of the journey or when opportunity afforded.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claim or of mechanical equivalents to the structures set forth.

Having described my invention, what I claim, and desire to secure by Letters Patent, is—

As a new article of manufacture, a tire comprising an outer tube, and an inner tube of reduced diameter, a plurality of transverse diaphragms dividing the space between said tubes into a plurality of annular compartments, longitudinally-disposed webs dividing said annularly-disposed compartments into smaller compartments, and valves which may open communication from said smaller compartments to said inner tube.

In witness whereof I have hereunto set my hand in the presence of two witnesses.

JOSEPH DUPONT.

Witnesses:
FRANCIS E. COPELAND,
LOUIS CLOUTIER.